United States Patent Office 2,808,788
Patented Oct. 8, 1957

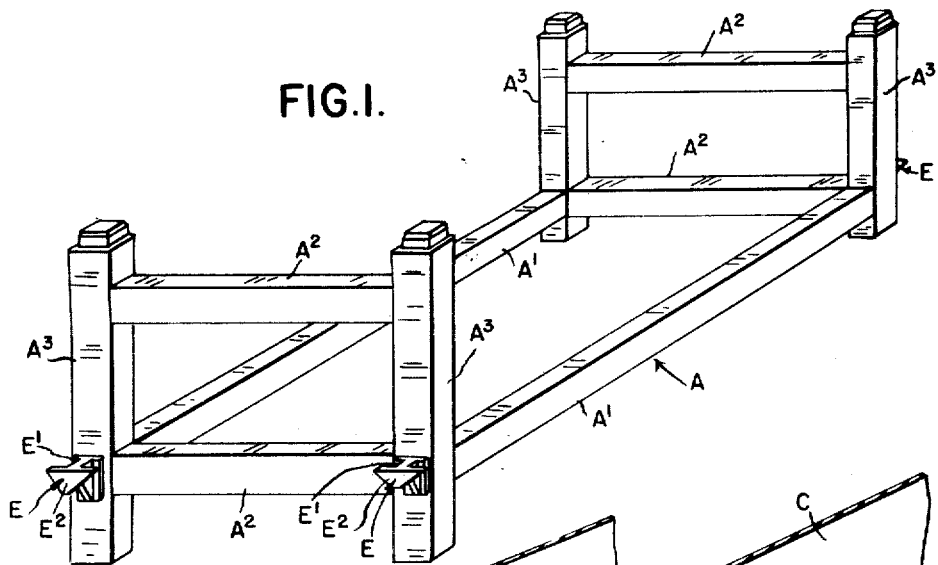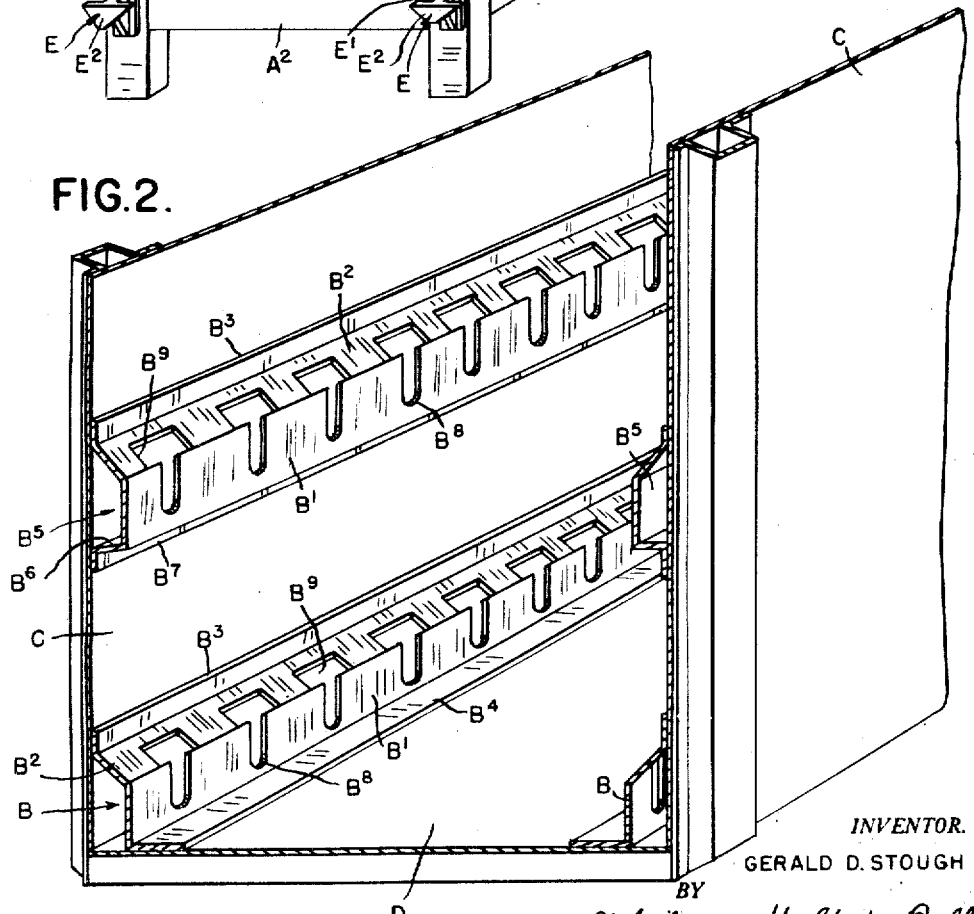

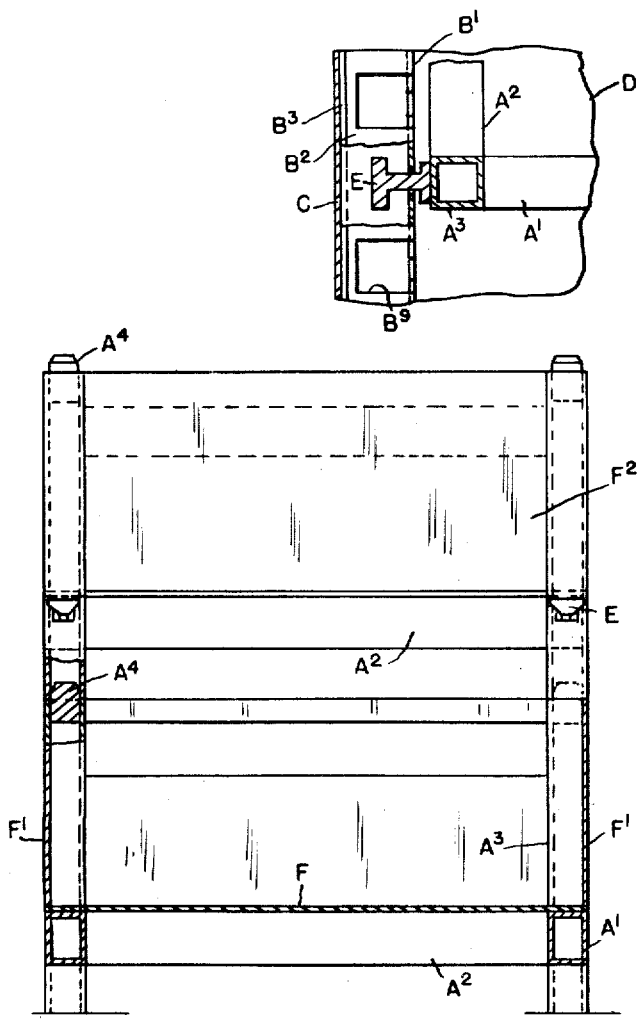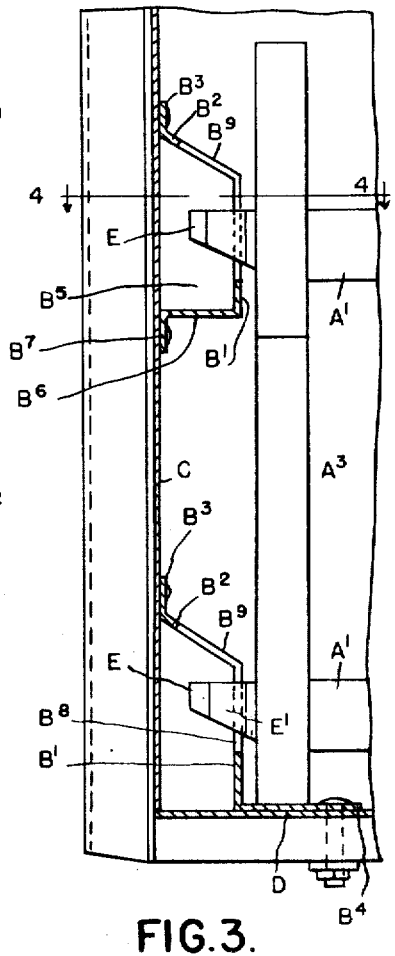

1

2,808,788

SYSTEM FOR THE HANDLING AND TRANSPORTATION OF PARTS, FINISHED ARTICLES, OR PACKAGED GOODS

Gerald D. Stough, Detroit, Mich., assignor to Whitehead & Kales Company, River Rouge, Mich., a corporation of Michigan Application November 8, 1954, Serial No. 467,264

12 Claims. (Cl. 105—367)

In the manufacture of complex structures, such for instance as motor vehicles, the parts entering into the final assembly are frequently manufactured in different localities and the cost of handling and transporting these parts to the assembly plant is a very considerable factor in the price of the product.

It is the object of the invention to obtain a system in which the labor and time required is reduced with better protection of the parts during transit and of the vehicles by which they are transported. To this end the invention consists in the system and the structural parts thereof as hereinafter set forth.

With the present facilities for handling and transportation of parts to the final assembly plant, one system includes the placement of the parts in holders or containers which have an exact dimensional relation to the storage space within the vehicle for transport. Thus, the holder may have one dimension which is substantially the full width of the space within a railroad car or other transport vehicle or it may be an exact fraction of such dimension. This permits of arranging the holders in successive stacks to occupy the full height and length of the storage space. However, to take care of inertial stresses or impacts incident to movement of the vehicle some form of additional anchoring means is required. If the holders occupy the full length of the car from end to end they may hold each other against longitudinal shifting, but this involves cumulative stresses on the individual holders which they may not be designed to take care of and injury to the content may result. In another system the holders are supported by the walls of the vehicle to which they are secured by various means. This may develop stresses in said walls which they are not designed to carry without detrimental effect on the life of the vehicle.

One important adjunct in the handling of packaged freight is the so called lift-truck or some other mechanical loading device which is a motorized small vehicle having lifting forks for engaging and holding the load and capable of traveling with the load into the car and to the position where the load is to be deposited. With my improved system this lift-truck may be utilized for the loading of the vehicle, and the holders or containers in which the parts are packaged are of unique construction as is also the means for anchoring said holders within the vehicle or storage chamber.

Such constructions are illustrated in the accompanying drawings in which:

Fig. 1 is a perspective view of one of the portable merchandise holders or containers.

Fig. 2 is a fragmentary perspective view of a railway car or other transport vehicle showing the cooperating means therein for anchoring the holders so as to relieve the same of all stresses, static or inertial, other than that of the individual load, and showing parts broken away and in section.

Fig. 3 is a cross section through a portion of the car body showing the holders in engagement with the anchoring means therefor.

2

Fig. 4 is a horizontal section on line 4—4, Fig. 3.

Fig. 5 is an end elevation of a plurality of holders or containers arranged in a vertical stack, and showing parts broken away and in section.

*Merchandise holders*

The holders, containers or racks for the parts to be transported are standard, not only in one dimension but in all three, or they may be exact multiples of standard unit dimensions. As illustrated in Fig. 1, the holder or rack A includes a rectangular horizontal frame having side members $A^1$, end members $A^2$ and post members $A^3$ at the four corners. This structure may be made of any suitable material, such as wood or preferably metallic members and is of sufficient strength to absorb all stresses, static or inertial, developed by its individual content or load. For retaining this load the holder is provided with additional elements which are varied according to the nature of the parts to be held thereby. Thus, it may be made with a platform F and side and end walls $F^1$ and $F^2$ secured to the frame of a holder for the parts, as shown in Fig. 5, or the parts may be secured to the frame by any other suitable means. The important feature is that the over-all dimensions of the holder with its load are either of the standard unit dimensions or some exact multiple thereof. However, the long dimension of the holder preferably corresponds to the width of the storage space in a car or other transport. Where the frame of the holder is formed of metallic tubing the upper ends of the post members $A^3$ may be provided with projecting pin portions $A^4$ for engaging the lower ends of posts in a superimposed holder in a stack.

*Positioning and anchoring means*

Cooperating with these holders or racks A are positioning and anchoring means which may be in the storage chamber of a transport vehicle or in a depot where the parts are to be temporarily stored. All available space within the storage chamber may be utilized because the positioning and anchoring means will retain the holders close to each other but out of stress communicating contact. Fig. 2 shows this positioning and anchoring means comprising horizontal sheet metal rails B extending longitudinally of and secured to the side walls C enclosing the storage space. Each horizontal rail B has a plate-like upright portion $B^1$ spaced from and substantially parallel to a side wall C, and has a plate-like laterally extending portion $B^2$ located between the upper end of the portion $B^1$ and a side wall. Each laterally extending portion $B^2$ has a vertical flange $B^3$ secured to a side wall C. For engaging the holders A that are directly supported on the floor D of the storage chamber each rail B has a flange $B^4$ secured to said floor. For anchoring upper holders A of a stack at a higher level within the storage chamber I have provided horizontal rails $B^5$ that are quite similar to the rails B but are secured solely to the side walls C. Instead of having a floor flange $B^4$, each roll $B^5$ has a lateral portion $B^6$ and a vertical flange $B^7$ below the portion $B^1$. Each flange $B^7$ is secured to a side wall C. The connections between the holders A and these anchoring rails B and $B^5$ are formed by laterally projecting horizontal T-shaped members or lugs E secured to each of the four corner posts $A^3$ substantially at the level of the horizontal members $A^1$ and $A^2$. The upright plate-like portions $B^1$ of the rails B and $B^5$ have upwardly opening vertical slots $B^8$ therein, while the laterally extending portions $B^2$ have enlarged upwardly opening apertures $B^9$ for receiving the heads $E^2$ of the T-shaped members or lugs E. The spacing of these slots $B^8$ and apertures $B^9$ lengthwise of the rails corresponds to the transverse spacing of the T-shaped members E on the holders A. Such spacing may be of unit dimensions or the spacing of said members E may be exact multiples of the uniform spacing of said slots $B^8$. The slots $B^8$ extend below the stem or shank portions $E^1$ of the T-shaped members E so that the rails are entirely free of the static load of the holder. However, the material of the upright portion $B^1$ on opposite sides of each slot $B^8$ in cooperation with the stem or shank portions $E^1$ will retain the holders A from any horizontal movement longitudinally of the storage chamber. Also, the interlocking engagement between the head portions $E^2$ of the lugs E and the upright portions $B^1$ of the rails will retain the holders A from any horizontal movement transversely of the storage chamber. This is true also of the higher rails $B^5$ which cooperate with the upper holders A in a vertical stack. The static load in these holders A will be carried through the posts $A^3$ thereof into the posts of the holder below the same and finally into the floor or platform D of the storage chamber. The inertial stresses occasioned by any tendency of the holders A to move longitudinally or transversely of the car will be carried into the rails B and $B^5$ and through the same into the side walls C of the storage chamber.

As above stated this positioning and anchoring means may be placed either in a transport vehicle or in a storage chamber within a depot. In either case the contents of the holder or rack need not be removed therefrom from the time it is first placed in the holder or rack at the parts manufacturing plant to the time when it is required for assembly in the final structure. By use of a lift-truck the holders A, individually or in a stack, may be transported to and positioned in the storage space within the car or depot. For example, the holders A are lowered by a lift-truck from a raised position in the storage space within the car or depot to a position where the T-shaped members E on opposite ends of the holders A are engageable with the upwardly opening slots $B^8$ and apertures $B^9$ in the stationary rails B and $B^5$. Such lift-truck may be used to deposit the holders on the floor D or on top of another holder in a stack. In other words, interlocking engagement between the T-shaped members E and the rails B and $B^5$ is effected by a vertical downward movement of the holders A relative to the stationary rails B and $B^5$. In a reverse manner the holders A may be raised by a lift-truck to disengage the T-shaped members E from the rails B and $B^5$, so that the holders A may thereafter be removed by the lift-truck from the storage chamber of the vehicle or depot. Thus, after the original packing of the parts in the holder A, such parts need not be removed from the holder until they arrive at the final assembly plant. This will effect a great saving in labor and time and correspondingly reduce the cost of the final product.

It has been stated that the said positioning and anchoring means may be employed in a storage chamber of either a transport vehicle or of a stationary depot. Such transport vehicles may be cargo trailers, box cars, boats or airplanes. It has also been stated that the merchandise holders A may be containers or racks, hence the terms "holder" and "rack" respectively employed in the claims are to be construed interchangeably as any portable article or merchandise carrying receptacle capable of containing or storing articles or merchandise, and capable of being anchored individually or in a vertical stack, as aforesaid.

While I have thus far described my system as adapted for handling and transporting parts to an assembly plant, it is obvious that it may have other uses, such as the handling and transportation of merchandise. An essential feature is that the transport vehicle is provided above its floor D with spaced anchoring structures B and $B^5$ between which holders A for articles of merchandise are placed, together with interlocking means on said holders and anchoring structures for positioning each individual holder and anchoring it against displacement by inertial forces or the transmission of transverse stresses to or from any other holder while the weight of the holders and their contents is supported by the floor. These anchoring structures may be adjacent to opposite side walls of a freight car or they may be arranged on any transport vehicle above the load supporting floor to form stalls into which the article holders may be conveyed by a lift truck and engaged with the anchoring means. By such construction practically all storage space may be utilized and the holders quickly loaded and unloaded.

What I claim as my invention is:

1. In a system for handling and transporting articles of mechandise on portable holders therefor in a transport vehicle having a floor and an upright wall above said floor; an anchorage structure attachable to said upright wall and having an upright surface and a laterally extending surface, said upright surface having upwardly opening elongated slots extending vertically therein to permit the stems of laterally projecting substantially T-shaped anchoring members on said holders to move lengthwise of said elongated slots during vertical movement of said holders so that the static load of said holders can be carried by said floor independently of both said upright wall and anchorage structure, and said lateral surface having upwardly opening apertures therein to permit the heads of said T-shaped anchoring members to move behind said upright surface for interlocking engagement therewith during movement of said stems lengthwise of said elongated slots and thereby to prevent horizontal displacement of said stem from said elongated slots and to cause said holders to be held against horizontal displacement relative to said upright wall.

2. In a system for handling and transporting articles of merchandise on portable holders therefor in a transport vehicle having a floor and an upright wall above said floor; an anchorage structure attachable to said upright wall and having an upright surface having elongated slots extending vertically therein to permit portions of laterally projecting anchoring members on said holders to move lengthwise of said elongated slots during vertical movement of said holders so that the static load of said holders can be carried by said floor independently of both said upright wall and anchorage structure, said anchorage structure being provided at the rear of said upright surface with apertures to permit other portions of said anchoring members to move behind said upright surface for interlocking engagement therewith during movement of said first mentioned portions lengthwise of said elongated slots and thereby to prevent horizontal displacement of said first mentioned portions from said elongated slots and to cause said holders to be held against horizontal displacement relative to said upright wall.

3. In a system for handling and transporting articles of merchandise on portable holders therefor in a transport vehicle having a floor and an upright wall above said floor; an anchorage structure attachable to said upright wall and having an upright surface and a laterally extending surface, said upright surface having elongated slots extending vertically therein to permit portions of laterally projecting anchoring members on said holders to move lengthwise of said elongated slots during vertical movement of said holders so that the static load of said holders can be carried by said floor independently of both said upright wall and anchorage structure, and said lateral surface having apertures therein to permit other portions of said anchoring members to move behind said upright surface for interlocking engagement therewith during movement of said first mentioned portions lengthwise of said elongated slots and thereby to prevent horizontal displacement of said first mentioned portions from said elongated slots and to cause said holders to be held against horizontal displacement relative to said upright wall.

4. In a system for handling and transporting articles of merchandise on portable holders therefor in a transport vehicle having a floor and an upright wall above said floor; a portable holder for articles of mechandise movable vertically relative to said floor and having laterally projecting substantially T-shaped anchoring members adapted to be engaged with upwardly opening elongated slots extending vertically in an upright surface of an anchorage structure on said upright wall, the stems of said T-shaped members being movable lengthwise of said elongated slots from the open upper ends thereof during vertical movement of said holders to permit the static load of said holders to be carried by said floor independently of both said upright wall and anchorage structure, and the heads of said T-shaped members being movable behind said upright surface for interlocking engagement therewith during movement of said stems lengthwise of said elongated slots to prevent horizontal displacement of said stems from said elongated slots and to hold said holders against horizontal displacement relative to said upright wall.

5. In a system for handling and transporting articles of merchandise on portable holders therefor in a transport vehicle having a floor and an upright wall above said floor; a portable holder for articles of merchandise movable vertically relative to said floor and having laterally projecting anchoring members adapted to be engaged with elongated slots extending vertically in an upright surface of an anchorage structure on said upright wall, portions of said anchoring members being movable lengthwise of said elongated slots during vertical movement of said holders to permit the static load of said holders to be carried by said floor independently of both said upright wall and anchorage structure, other portions of said anchoring members being movable behind said upright surface for interlocking engagement therewith during movement of said first mentioned portions lengthwise of said elongated slots to prevent horizontal displacement of said first mentioned portions from said elongated slots and to hold said holders against horizontal displacement relative to said upright wall.

6. In combination, a transport vehicle having a storage chamber provided with a load-sustaining floor and provided above said floor with spaced upright side walls, a portable article carrying rack within said storage chamber and having at opposite ends thereof load-sustaining means supported upon said floor, the length of said rack being substantially equal to the distance between said spaced upright side walls, and means restraining said rack against horizontal movement while permitting the static load thereof to be carried entirely by said floor independently of said upright side walls, including horizontally extending rails connected to said upright side walls and bridging opposite ends of said rack, said rails having upright portions spaced inwardly from said upright side walls and provided with longitudinally spaced vertically extending upwardly opening slots, and lugs on opposite ends of said rack having portions removably engaging selected slots in said upright portions and having other portions in the space between said upright portions and said upright side walls and detachably interlocked with said upright portions.

7. In combination, a transport vehicle having a storage chamber provided with a loaded-sustaining floor and provided above said floor with spaced upright side walls, a portable article carrying rack within said storage chamber and having at opposite ends thereof load-sustaining means supported upon said floor, the length of said rack being substantially equal to the distance between said spaced upright side walls, and means restraining said rack against horizontal movement while permitting the static load thereof to be carried entirely by said floor independently of said upright side walls, including anchorage members mounted on said upright side walls opposite the ends of said rack, said anchorage members having upright portions provided with vertically extending upwardly opening slots, and lugs on opposite ends of said rack having portions removably engaging selected slots in said upright portions and having other portions in rear of said selected slots and detachably interlocked with said upright portions.

8. In combination, a storage chamber having a load-sustaining floor and provided above said floor with spaced upright side walls, a portable article carrying rack within said chamber and having at opposite ends thereof load-sustaining means supported upon said floor, the length of said rack being substantially equal to the distance between said spaced upright side walls, and means restraining said rack against horizontal movement while permitting the static load thereof to be carried by said floor independently of said upright side walls, including anchorage means on said upright side walls opposite the ends of said rack, and anchorage means on said rack at opposite ends thereof detachably interlocked with the anchorage means on said upright side walls.

9. In combination, a storage chamber having a load-sustaining floor and having above said floor an upright wall provided with an anchorage member, said anchorage member having an upright portion provided with a vertically extending upwardly opening slot, a portable article carrying rack within said storage chamber opposite said anchorage member and having at its opposite ends load-sustaining means supported upon said floor, and means restraining said rack against horizontal movement while permitting the static load thereof to be carried by said floor independently of said upright wall, including an anchorage member on said rack removably engaging said slot and having means in rear of said slot detachably interlocked with said upright portion.

10. In combination, a storage chamber having a load-sustaining floor and having an upright wall above said floor, a portable article carrying rack beside said wall and having at opposite ends thereof load-sustaining means supported upon said floor, and means restraining said rack against horizontal movement while permitting the static load thereof to be carried by said floor independently of said upright wall, including two anchorage members located between said rack and said upright wall and respectively mounted upon said upright wall and upon said rack, one of said members having an upright portion provided with a vertically extending upwardly opening slot, and the other of said members having a portion removably engaging said slot and having another portion in rear of said slot and detachably interlocked with said upright portion.

11. In combination, a storage chamber provided with a load-sustaining floor and provided above said floor with spaced upright side walls, upper and lower portable article carrying racks within said chamber and having load-sustaining elements at opposite ends thereof, the load-sustaining elements of said lower rack being supported upon said floor, the load-sustaining elements of said upper rack being supported upon the load-sustaining elements of said lower rack, whereby said upper and lower racks are arranged in a vertical stack, the length of each rack being substantially equal to the distance between said spaced upright side walls, and means restraining said upper and lower racks against horizontal movement while permitting the static load thereof to be carried by said floor independently of said upright side walls, including anchorage means on said upright side walls opposite the ends of said upper and lower racks, and anchorage members on said upper and lower racks at opposite ends thereof and having means detachably interlocked with the anchorage means on said upright side walls.

12. In combination, a storage chamber provided with a load-sustaining floor and provided above said floor with an upright wall, upper and lower portable article carrying racks within said chamber and having load-sustaining elements at opposite ends thereof, the load-sustaining elements of said lower rack being supported upon said floor, the load-sustaining elements of said upper rack being supported upon and interlocked with the load-sustaining elements of said lower rack, whereby said upper and lower racks are arranged in a vertical stack, and means restraining said upper and lower racks against horizontal movement while permitting the static load thereof to be carried by said floor independently of said upright wall, including anchorage means on said upright wall and bridging at least one of said racks, and anchorage means on said bridged rack having means detachably interlocked with the anchorage means on said upright wall.

References Cited in the file of this patent

UNITED STATES PATENTS

| | | |
|---|---|---|
| 1,250,370 | Shur | Dec. 18, 1917 |
| 1,699,529 | Gibbs et al. | Jan. 22, 1929 |
| 2,155,872 | Reifer et al. | Apr. 25, 1939 |
| 2,330,852 | White | Oct. 5, 1943 |
| 2,467,681 | McKinney | Apr. 19, 1949 |
| 2,555,529 | Batts | June 5, 1951 |
| 2,575,326 | Anderson | Nov. 20, 1951 |
| 2,603,167 | Webster et al. | July 15, 1952 |
| 2,613,615 | Nampa | Oct. 14, 1952 |
| 2,616,375 | Nampa | Nov. 4, 1952 |
| 2,679,214 | Nampa | May 25, 1954 |

FOREIGN PATENTS

| | | |
|---|---|---|
| 639,573 | Great Britain | June 28, 1950 |

U. S. DEPARTMENT OF COMMERCE
PATENT OFFICE

CERTIFICATE OF CORRECTION

Patent No. 2,808,788     Gerald D. Stough     October 8, 1957

It is hereby certified that error appears in the printed specification of the above numbered patent requiring correction and that the said Letters Patent should read as corrected below.

Column 5, line 61, for "loaded-sustaining" read — load-sustaining —.

Signed and sealed this 24th day of June 1958.

(SEAL)

Attest:
KARL H. AXLINE

Attesting Officer

ROBERT C. WATSON
Commissioner of Patents